US011374763B2

(12) United States Patent
De La Rocha Gómez-Arevalillo et al.

(10) Patent No.: US 11,374,763 B2
(45) Date of Patent: Jun. 28, 2022

(54) METHOD AND SYSTEM FOR INTER-DLT NETWORKS TRUST ENHANCEMENT

(71) Applicant: TELEFONICA DIGITAL ESPAÑA, S.L.U., Madrid (ES)

(72) Inventors: Alfonso De La Rocha Gómez-Arevalillo, Madrid (ES); José Luis Nuñez Díaz, Madrid (ES)

(73) Assignee: HIPERBARIC, S.A., Madrid (ES)

( * ) Notice: Subject to any disclaimer, the term of this patent is extended or adjusted under 35 U.S.C. 154(b) by 0 days.

(21) Appl. No.: 16/906,818

(22) Filed: Jun. 19, 2020

(65) Prior Publication Data
US 2020/0403799 A1 Dec. 24, 2020

(30) Foreign Application Priority Data

Jun. 20, 2019 (EP) .................................... 19382513

(51) Int. Cl.
*H04L 9/32* (2006.01)
*H04L 9/06* (2006.01)
(Continued)

(52) U.S. Cl.
CPC .......... *H04L 9/3236* (2013.01); *H04L 9/0637* (2013.01); *H04L 9/0643* (2013.01);
(Continued)

(58) Field of Classification Search
CPC ... H04L 9/3236; H04L 9/0637; H04L 9/0643; H04L 9/3218; H04L 63/12; H04L 63/18;
(Continued)

(56) References Cited

U.S. PATENT DOCUMENTS 10,298,395 B1 * 5/2019 Schiatti ................. H04L 9/3221
10,735,205 B1 * 8/2020 Wentz ................... H04L 9/3257
(Continued)

FOREIGN PATENT DOCUMENTS

WO  WO 2019/092544 A1  5/2019

OTHER PUBLICATIONS

Jacob Eberhardt et al., "ZoKrates-Scalable Privacy-Preserving Off-Chain Computations", Mar. 16, 2018, XP055540331, DOI: 10.1109/Cybermatics_2018.2018.00199 Retrieved from the Internet: URL:https://www.ise.tu-bulin.de/fileadmin/fg308/publications/2018/2018_eberhardt_ZoKrates.pdf.
(Continued)

*Primary Examiner* — Darren B Schwartz
(74) *Attorney, Agent, or Firm* — Don D. Cha; HDC Intellectual Property Law, LLP

(57) ABSTRACT

It is proposed a technical solution to leverage the level of trust in scenarios with a high number of independent computing nodes from independent and heterogeneous DLT networks. This solution defines the technical modules required to implement a self-governed decentralized infrastructure that ensures that every participant node (computing node) in a DLT network connected to the proposed system (implementing the proposed method) can exploit additional validation and consensus policies in their transactions and smart contracts. Through the proposed mechanism they can enjoy an equivalent level of trust as if all the nodes from the connected networks were part of a single common DLT network. The proposed solution enables the implementation of dedicated validation policies to leverage the level of trust of any of the connected networks without the need of dedicated infrastructure.

10 Claims, 4 Drawing Sheets

(51) Int. Cl.
*H04L 9/40* (2022.01)
*H04L 67/1087* (2022.01)

(52) U.S. Cl.
CPC ............ *H04L 9/3218* (2013.01); *H04L 63/12* (2013.01); *H04L 63/18* (2013.01); *H04L 63/20* (2013.01); *H04L 2209/38* (2013.01)

(58) Field of Classification Search
CPC ... H04L 63/20; H04L 2209/38; H04L 9/3239; H04L 67/1091
See application file for complete search history.

(56) References Cited

U.S. PATENT DOCUMENTS

| | | | |
|---|---|---|---|
| 11,012,242 B1* | 5/2021 | Griffin | H04L 9/3247 |
| 2018/0109516 A1* | 4/2018 | Song | H04L 9/3268 |
| 2019/0042620 A1* | 2/2019 | Garagiola | G06F 16/2453 |
| 2019/0165943 A1* | 5/2019 | Chari | H04L 9/30 |
| 2019/0229919 A1* | 7/2019 | Gurkan | H04L 9/0637 |
| 2019/0312855 A1* | 10/2019 | Sharma | G06F 16/1834 |
| 2019/0372772 A1* | 12/2019 | Novotny | H04L 9/3239 |
| 2019/0372781 A1* | 12/2019 | Ra | H04L 9/3263 |
| 2020/0067697 A1* | 2/2020 | Puddu | G06F 21/602 |
| 2020/0099524 A1* | 3/2020 | Schiatti | H04L 9/3221 |
| 2020/0153605 A1* | 5/2020 | Hu | G06F 21/64 |
| 2020/0153615 A1* | 5/2020 | Chen | H04L 9/088 |
| 2020/0169385 A1* | 5/2020 | Zhuo | G06F 16/9027 |
| 2020/0174990 A1* | 6/2020 | Pratkanis | H04L 9/0637 |
| 2020/0193425 A1* | 6/2020 | Ferenczi | G06Q 20/3827 |
| 2020/0204352 A1* | 6/2020 | Thompson | H04L 9/3239 |
| 2020/0266985 A1* | 8/2020 | Covaci | H04L 9/085 |
| 2020/0322128 A1* | 10/2020 | Hu | H04L 9/3218 |
| 2020/0374300 A1* | 11/2020 | Manevich | G06F 16/2255 |
| 2020/0396065 A1* | 12/2020 | Gutierrez-Sheris | H04L 67/1095 |
| 2021/0144006 A1* | 5/2021 | Ma | H04L 9/3218 |
| 2021/0226795 A1* | 7/2021 | Covaci | H04L 63/12 |
| 2021/0233064 A1* | 7/2021 | Maim | G06Q 20/401 |

OTHER PUBLICATIONS

Jacob Eberhardt et al., "Off-Chaining Models and Approaches to Off-chain Computations", Proc. 2nd. Workshop on Scalable and Resilient Infrastructures for Distributed Ledgers, Serial '18, Jan. 1, 2018, pp. 7-12.

\* cited by examiner

METHOD AND SYSTEM FOR INTER-DLT NETWORKS TRUST ENHANCEMENT

CROSS-REFERENCE TO RELATED APPLICATIONS

This application is a U.S. National Stage Application under 35 U.S.C. § 119 and claims priority benefit of European Patent Application No. 19382513.0 filed on Jun. 20, 2019, which is incorporated herein by reference in its entirety.

TECHNICAL FIELD

The present invention relates to interoperating DLT (Distributed Leger Technology) networks and more particularly, to a method and system to leverage the level of trust offered by a DLT architecture with a high number of independent nodes from independent and heterogeneous small (interoperating) DLT networks.

BACKGROUND OF THE INVENTION

A distributed ledger (also called a shared ledger or distributed ledger technology, DLT) imply a consensus of replicated, shared a synchronized digital data across multiple nodes. There is no central administrator or centralized data storage.

The distributed ledger database is spread across several nodes (devices) on a peer-to-peer network, where each replicates and saves an identical copy of the ledger (data) and updates itself independently. When a ledger update happens, each node constructs the new transaction, and then the nodes vote by consensus algorithm on which copy is correct. Once a consensus has been determined, all the other nodes update themselves with the new, correct copy of the ledger (security is accomplished through cryptographic keys and signatures). The participant nodes (devices) of a distributed ledger may apply an agreed protocol for verifying, storing, maintaining and modifying data stored in the distributed ledger. One form of distributed ledger design is the blockchain system; that is, it can be said that the blockchain technology is a type of DLT.

Nowadays, one of the main issues of DLT is the lack of interoperability between different DLT networks using different underlying protocols and/or technologies. Another issue is the low level of trust offered by permissioned and private networks with a small number of nodes compared to public and semi-public networks with a high number of independent nodes (because, generally speaking, the level of trust of DLT increases, the higher the number of participant nodes involved).

Actually, interoperability is currently one of the main concerns due to the massive adoption of DLT technology. Independent DLT networks of different nature cannot communicate to each other or benefit from the level of trust of bigger or more public networks. There are several projects right now exploring potential solutions to enable a cross-communication between independent DLT networks, as for example:

- Protocol-based solutions: They aim to perform interconnection between DLT networks of different nature by translating at a low-level messages and transactions from one network to another. Thus, through these interconnection protocols, nodes from a network A are able to listen to events, the validation of transactions, or the exchange of tokens in an independent network B. These low-level methods require changes over the underlying protocols of the DLT networks, and ad-hoc efforts for each and every new type of network that needs to be interconnected. Additionally, in some cases, a dedicated gateway infrastructure is required to ensure the correct operation and translation of operations between networks. An example of this type of interoperability protocols between networks is Ripple's Interledger Protocol (ILP) or Corda's Oracles, which implement a mechanism interconnecting different financial data base system for the specific use case of P2P payments. A popular solution in this family of interoperability protocols to enhance the trust of small networks is the use of sidechains. Sidechains are small DLT networks of a specific technology running their own ledger and consensus. Periodically, these networks make a summary of all the transactions performed in the network in a specific time interval, and they register the cryptographic summary in the ledger of a main network of the same technology with a higher number of nodes (and hence trust). This approach enables complete traceability of transactions and summary registrations from sidechains to the main network.
- Consensus-based solutions: They build an overlaying DLT network and consensus algorithm between networks to ensure the correct communication, correctness, and translation of transactions between different independent networks. Solutions such as Polkadot or Cosmos, under development, use an overlaying DLT infrastructure, with dedicated gateway nodes connected to every independent DLT network ruled by their own overlaying consensus. These types of projects allow the exchange of tokens of different nature between different networks using their overlaying consensus and infrastructure, as well as the communication between smart contracts in different networks.
- Interoperability API-based solutions: The last interoperability approach followed by some projects is the use of a gateway API to manage the registration of periodic summaries (i.e. a hash or cryptographic snapshot of the network in a specific timestamp) in the ledger of public networks, or other networks with a higher number of nodes. This approach is equivalent to the one followed by sidechains, with the main difference that in sidechains the interoperability is tackled at a protocol level, while the use of interoperability APIs is at an application level.

However, the aforementioned proposals imply several drawbacks. For example, they require the deployment of dedicated infrastructure for the interconnection of DLTs, being the highest level of trust of the whole system the one given by the overlaying DLT and gateway infrastructure, requiring additional technical mechanisms to leverage the high level of trust of any of the connected networks. Even more, if a protocol-based approach of interconnection is implemented, specific deployments and low-level changes to the protocols are required, what can lead to performance and functionality limitations and, the latter does not support the interoperability of networks of different nature.

Regarding the use of sidechains, this mechanism allows the complete traceability of transactions in sidechains in a main network with a high level of trust. However, the use of sidechains forces the use of the same underlying technology in the sidechain and in the main network, enabling only the leverage of a single network for the trust enhancement.

Finally, the use of API-based interoperability should be seen as a temporary patch for projects that do not require a high level of decentralization and traceability of the information between networks. The API represents a centralized point in the DLT decentralized network, and when the API extracts information from one network to another, the traceability between the child network and the parent network is lost Therefore, there is a need of an improved interoperability solution for DLT networks which overcomes the limitations of existing prior art solutions.

SUMMARY

The problems found in prior art techniques are generally solved or circumvented, and technical advantages are generally achieved, by the disclosed embodiments which provide a method and system to improve the level of trust of interoperating DLT networks. It is proposed a technical architecture to leverage the level of trust in scenarios with a high number of independent computing nodes from independent and heterogeneous DLT networks. This architecture defines every technical module required to implement a self-governed decentralized infrastructure that ensures that every participant (computing node) in a DLT network connected to the proposed system (implementing the proposed method) can exploit additional validation and consensus policies in their transactions and smart contracts. Through the proposed mechanism they can enjoy an equivalent level of trust as if all the nodes from the connected network were part of a single common DLT network. The more DLT networks and nodes connected to the system, the higher the potential level of trust that can be leveraged for transactions and smart contracts in every network.

The architecture proposed by the present invention enables the implementation of dedicated validation policies to leverage the level of trust of any of the connected networks without the need of dedicated infrastructure and maintaining the interconnection and exchange capabilities of the aforementioned approaches. Furthermore, this invention supports the interconnection of any DLT offering smart contract execution without the need of modifying the underlying P2P or consensus protocols, ensuring the support of the underlying functionalities and performance of the interconnected networks. Moreover, the trust enhancement mechanism of this invention is fine-grained, as trust is achieved at a smart contract-level instead of at a network-level, enabling independent smart contracts (distributed programs) to leverage their own trust policy according to their specific use cases. It can be therefore said that, in the present invention, the DLT networks interconnection problem is tackled at a smart contract level.

The proposed method and system enable different DLT networks to leverage the level of trust of other networks. Thus, DLT applications deployed over this inter-DLT networks architecture are abstracted of the actual underlying DLT platforms (of the particular protocol and technology used by the DLT networks) and are able to seamlessly run smart contracts with enhanced trust compared to the underlying DLT network where they are stored and deployed.

According to a first aspect, the present invention proposes a method for enhancing the level of trust of a first Distributed Ledger Technology, DLT, network using one or more second DLT networks, where the first and the second DLT networks comprise several electronic computing nodes and are independent DLT networks connected by one or more telecommunications networks, the method comprising the following steps performed in the first DLT network:

a) Receiving in (a node of) the first DLT network a request to validate a smart contract, where for the validation of the smart contract a certain trust policy is used;

b) Computing (in the node) a hash value h(i) which identifies uniquely the current execution of the smart contract correspondent to the trust policy and its result, and storing said hash value in a database of the first DLT network;

c) Obtaining (in the node) the hash value of the previous execution of the smart contract h(i−1);

d) Transmitting (by the node of the first DLT network) to (a node of each) one or more second DLT networks, through the one or more telecommunications networks, a validation instruction including h(i) and a zero-knowledge proof, prf(i) being prf(i)=Proof(Pk,hp(i),diff(i)), where Proof( ) is a pre-established function (any known proof function of a ZkSnark algorithm), Pk is a pre-established random proof key, diff(i)=h(i)−h(i−1) and hp(i)=hash(h(i)∥diff(i)); the node of each second DLT network which receives said validation instruction usually distributes the validation instruction to all the nodes of each second DLT network.

e) Receiving (e.g. by the node of the first DLT network) through the one or more telecommunications networks, from each second DLT network to which a validation instruction has been sent, a validation result, where the validation result is obtained in each second DLT network by computing (in the nodes of each second DLT network): Verify (Vk, hp(i), prf(i)) where Verify( ) is a pre-established verification function (any known verification function of a ZkSnark algorithm), Vk is a pre-established random verification key, hp(i)=hash(h(i)∥diff(i)), and diff(i)=h(i)−h(i−1) where h(i) is the value of h(i) received from the first DLT network and h(i−1) is the hash value stored in the second DLT network in the previous execution of the validation for the smart contract;

f) Aborting (e.g. by the node of the first DLT network) the execution of the smart contract by the first DLT network, if the number of negative (unsuccessful) validation results received from the second DLT networks, is higher than a first pre-established threshold. In an embodiment, said first pre-established threshold=0, that is, if any validation result is negative, then the execution of the smart contract in the first DLT network is aborted.

In an embodiment, h(i)=hash(addr_SC_App,txid,fx(attr), attr,res) where addr_SC_App is the address of the application implementing the smart contract; txid the transaction ID that triggered the trust policy; fx(attr) the function that triggered the trust policy run; attr the attributes of the function; and res the result of the function.

In an embodiment, computation of Verify (Vk, hp(i), prf(i)) in step e) is made in all the computing nodes of each one or more second DLT networks and the validation result received from each one or more second DLT network in step e) is positive (successful) only if the result of the verification function is positive (successful) in all the computing nodes of said second DLT network or if the result of the verification function is positive (successful) in a number of the computing nodes of said second DLT network higher than a second pre-established threshold.

The smart contract to be validated is a smart contract may be for modification of a network ledger.

In an embodiment, the communications between nodes of the first DLT network and nodes of the one or more second DLT networks are made through governance instances in each node of the DLT networks, which manage the interconnection logic between computing nodes of different DLT networks, each governance instance storing information about the rest of the DLT networks.

In an embodiment, in step d), the governance instance of a computing node of the first DLT network, using stored network information of the one or more second DLT networks, sends the validation instruction to a governance instance of a computing node of each one or more second DLT networks through a first telecommunications network.

In an embodiment, (the governance instance of) each node of each DLT network has a register with the available trust policies in the DLT network and when a network user wants to add a new trust policy to one of the DLT networks, (the governance instance of) at least one node in said DLT network checks if the user has enough permissions to add a new trust policy and only if the user has permission, the new trust policy is registered. This checking is usually made by all the nodes of the DLT network.

Each DLT network (in his governance instances) has a register with available DLT networks to be used to enhance the level of trust, and when a network user requests to add a new DLT network, (the governance instance of) a computing node of the DLT network where the request is received, sends the request to the rest of the DLT networks (to nodes of the rest of DLT networks), the nodes of the DLT networks verify (running a certain verification logic) if the new DLT network is accepted and only if at least a pre-established threshold of the nodes of the DLT networks accept said new DLT network, the new DLT network is registered (in the governance instance of) the computing nodes of the DLT networks as a new DLT network to be used to enhance the level of trust.

According to a second aspect, the present invention proposes a system for enhancing the level of trust of a first Distributed Ledger Technology, DLT, network using one or more second DLT networks, where the first and the second DLT networks are independent DLT networks connected by one or more telecommunications networks, the system comprising the first DLT network and one or more second DLT networks, Each computing node of the first DLT network comprising a processor configured to:
  receive a request to validate a smart contract, where for the validation of the smart contract a certain trust policy is used (usually said request is sent to the rest of computing nodes of the first DLT network);
  compute a hash value h(i) which identifies uniquely the current execution of the smart contract correspondent to the trust policy and its result, and store said hash value in a database of the first DLT network;
  obtain the hash value of the previous execution of the smart contract h(i−1);
  transmit to a computing node of each second DLT network a validation instruction including h(i) and a zero-knowledge proof, prf(i) being prf(i)=Proof(Pk,hp(i),diff(i)), where Proof( ) is a pre-established function, Pk is a pre-established random proof key, diff(i)=h(i)−h(i−1) and hp(i)=hash(h(i)||diff(i));
the computing nodes of the one or more second DLT networks comprising:
  a processor configured to receive the validation instruction from the first DLT network directly or through another computing node of the second DLT network; determine a validation result by calculating: Verify (Vk, hp(i), prf(i)) where Verify( ) is a pre-established verification function, Vk is a pre-established random verification key, hp(i)=hash(h(i)||diff(i)), and diff(i)=h(i)−h(i−1) where h(i) is the value of h(i) received from the first DLT network and h(i−1) is the hash value stored in the computing node in the previous execution of the validation for the smart contract;
  where the execution of the smart contract in the first DLT network is aborted, if the number of negative validation results received from the one or more second DLT networks is higher than a first pre-established threshold.

The processor of the computing nodes of the one or more second DLT networks may be further configured to:
  if it receives the validation instruction from a computing node of the first DLT network: distribute said validation instruction to all the computing nodes of the second DLT network; receive the validation result from the computing nodes of the second DLT network; determine a validation result for the second DLT network based on the validation results in all the computing nodes of the second DLT network and to send said validation result to the computing node of the first DLT network which it has received the validation instructions from.

In a last aspect of the present invention, a computer program is disclosed, comprising computer program code means adapted to perform the steps of the described methods, when said program is run on processing means, said processing means being for example a computer, a digital signal processor, a field-programmable gate array (FPGA), an application-specific integrated circuit (ASIC), a microprocessor, a micro-controller, or any other form of programmable hardware. In other words, a computer program comprising instructions, causing a computer executing the program to perform all steps of the described method, when the program is run on a computer. A digital data storage medium is also provided for storing a computer program comprising instructions, causing a computer executing the program to perform all steps of the disclosed methods when the program is run on a computer.

Consequently, according to the invention, a method, system and storage medium according to the independent claims are provided. Favourable embodiments are defined in the dependent claims.

These and other aspects and advantages of the invention will be apparent from and elucidated with reference to the embodiments described hereinafter.

BRIEF DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DESCRIPTION OF EMBODIMENTS

The present inventions may be embodied in other specific system and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

Figure 1:
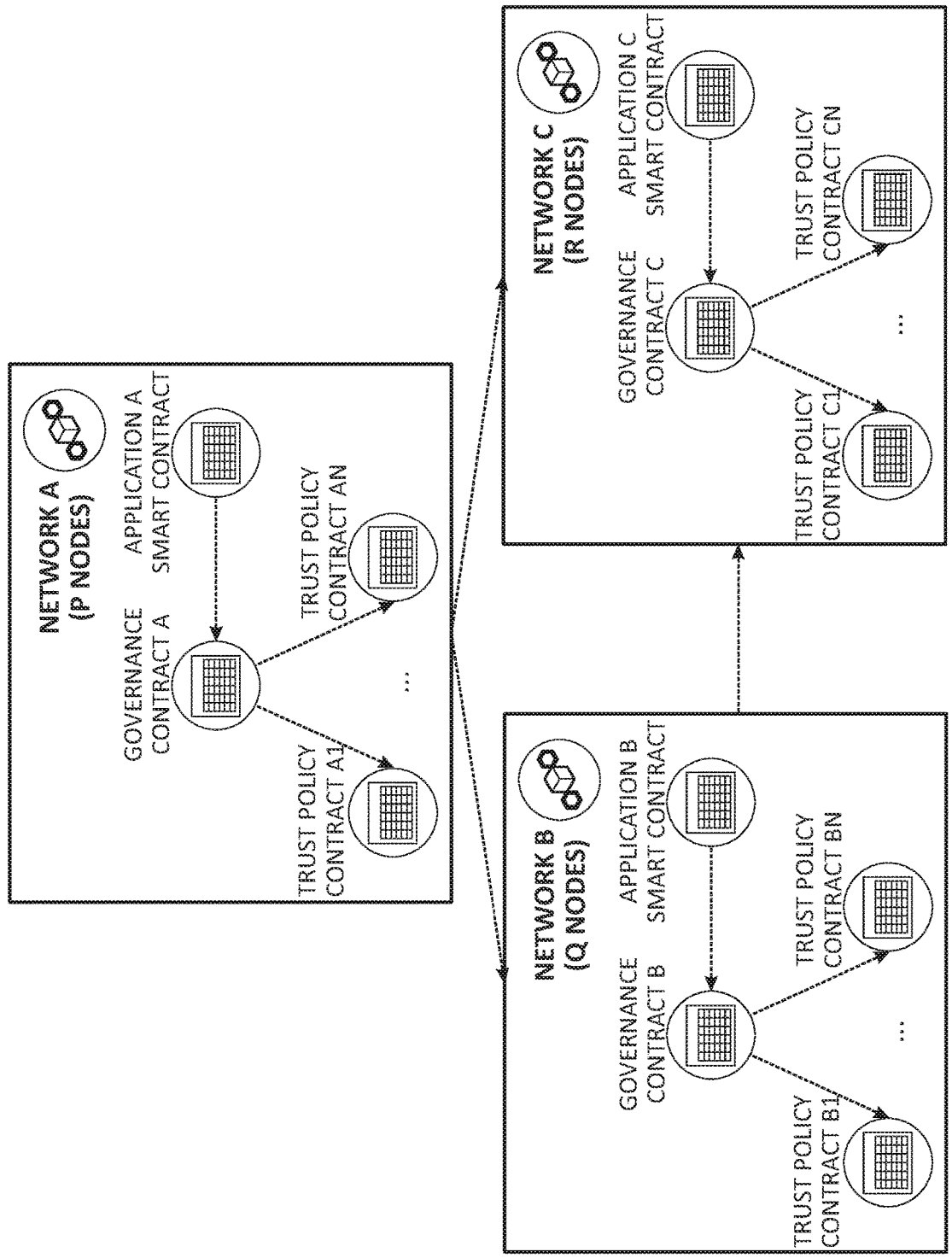
FIG. 1 shows a schematic diagram of the architecture proposed according to one embodiment in the present invention.

The embodiments of the present invention provide an improvement in the level of trust of interoperating independent and heterogeneous DLT networks. Each DLT networks comprises one or more (usually many of them) nodes (computing nodes); the computing nodes are electronic devices of any type (for example, servers) including databases storage capacity (memory) and processing capacity (processor). More particularly, the proposed embodiments implement a smart contract-based interconnection system between DLT networks that enable the exchange of tokens and the communication of smart contracts between different independent networks. The interconnection system leverages through smart-contract validation policies based on a ZKProof-based algorithm the level of trust of other of the interconnected DLT networks. Said proposed interconnection system comprises several technical modules (functional elements) required to implement a self-governed decentralized infrastructure that ensures that every participant (electronic computing node) in different DLT networks can exploit additional validation and consensus policies in their smart contracts FIG. 1 depicts the architecture of the proposed interconnection system according to one embodiment of the present invention, to allow this enhanced interoperability of the DLT networks. The system allows the interconnection of independent DLT networks, of different nature, as long as they support the execution of smart contracts. In order to establish communications between the networks any know communication technology (wired or wireless) could be used. Each network may have a different number of nodes, an independent consensus algorithm, different capabilities and underlying security mechanisms, and may be implemented over different P2P protocols and technologies. These networks may be private, public or permissioned. According to all these features, each connected DLT network will have a different underlying level of trust. In the embodiment shown in FIG. 1, there are 3 DLT interconnected networks (A, B and C) with P, Q and R nodes where Q>P>R (This is only an example and the present invention can be applied to any number of networks of any size).

In the embodiment shown in FIG. 1, each network (actually each node of the network) implements the following functional elements (also called modules or instances) to perform the different required tasks (in practice, said functional elements are usually implemented as smart contracts, that is, as distributed programs to be executed in computing nodes of the DLT network). This is only an example and some of the modules/contracts may be optional, that is, not all the modules are mandatory for the implementation of the present invention.

In the DLT networks, the smart contracts are usually executed in each node of the network. Hence, the modules (smart contracts) shown in FIG. 1 are executed in every computing node of each network; that is, the Governance contracts, the Trust policy contracts and the application smart contracts which are shown in FIG. 1 (and will be explained now) will be preferably installed and executed in every computing node of each network. Strictly speaking, the smart contracts are usually deployed by one node of the network, and from there the smart contracts are distributed and installed in all the nodes of the networks.

Governance Contract: The Governance Contract is responsible for managing the interconnection system governance logic (that is, it manages the communication logic with external networks) and listing all the connected networks with the corresponding DLT technology used in each network, the available connection points (endpoints) for each external network (or in other words, the governance contract of each node of the network stores the specific connection point/node to access each external network from each node of the current network), the average number of nodes and consensus each network has, and their underlying level of trust (according to the specific characteristics of each network). Additionally, the Governance contract also stores all the trust policies publicly available in a network. Every connected network has its own instance of the Governance contract installed in each node of the network (that is, each node has its Governance Contract Module) implemented in their underlying smart contract technology. These Governance Contract instances must be synchronized and the same in all connected networks (excepting the policy registry that may be different in each network, as each network can use different trust policies). Thus, the Governance contract performs the following tasks (in other words, it includes the following sub-modules or sub-functional elements):

Governance Logic: It determines all the governance rules of the internetwork system, such as which users are allowed to connect new networks to the system and the validation processes required, who can add new publicly indexable trust policies to the Policy Registry, the entities responsible for the update of the information in the network registry, the specific verification policies to allow the deployment of new trust policies or any other governance rules.

Network Registry: It stores all the information of the connected networks (A, B and C in the case of FIG. 1) to the system with the following tuple: (network_id, technology, number_of_nodes, type_of network, network_trusted_endpoints, Governance_address, trust_level). This tuple stores the basic information of each network required to support its operation over the interconnection system such as the blockchain protocol used, if it is a public or permissioned network, the type of consensus it uses, etc. Additional information about the networks can be stored in this registry according to the additional capabilities that want to be supported in alternative implementations of the system.

Policy Registry: It lists all the available trust policies in a specific DLT network. These policies may be shared by different networks, or they may be unique and exclusive of the DLT network. To add a new policy, a new entry must be added in the registry as follows: (trust_policy_id, policy_address, cost, performance_overhead), where trust_policy_id represents the unique id used by the Governance contract and application contracts in the network to instantiate the policy; policy_address specifies the address of the smart contract that implements the logic for the trust policy; cost determines the specific cost required to run the policy; and performance_overhead the percentage of performance overhead the smart contract will incur in for running the trust policy. The policy registry of a specific DLT network stores information not for all the available trust policies in all the networks but for the trust policies available from the specific DLT network. For a trust policy to be callable from a source DLT network, it requires an implementation of it in the source network but also in the target network (from which the trust wants to be leveraged). That is, for a trust policy to be callable from a first DLT network to a second DLT network, said trust policy should be available in both DLT networks.

Trust Policy Contracts: These contracts implement the specific trust policies to be executed when triggered by an application smart contract. They implement the specific validation algorithm (i.e. the external level of trust) and asset exchange correctness required by an application smart contract to accept the execution and modification of data in the ledger the trust policy contract is deployed over. Every trust policy uses a ZKProof-based algorithm (the ZKProof Trust Algorithm will be explained below) to validate the execution of external trust policies, and to ensure that external trust is leveraged, and internal network attacks may be identified. There is a great gamut of trust (i.e. validation) policies supported by design by the invention's architecture, as for example:

Basic external policy: May be used when any external trust validation is required. This trust policy runs the ZKProof trust algorithm with any of the existing external network (independently of their level of trust). If the validation of the ZKProof function in the external network is correct, the application of the smart contract is allowed to resume its execution in the source network, and to modify the ledger state.

High trust policy: May be triggered when a high level of trust is required. In this case, the ZKProof Trust Algorithm is triggered in several networks, or the network with a higher number of nodes in the system. The high level of trust of this policy leads to higher costs of execution and performance overhead. Specific signing policy: Policy triggered when a set of specific signatures from entities of external networks are required for the correct execution of the application smart contract.

High performance: Policy triggered when a high level of performance is required in the triggering smart contract. The execution time of smart contracts may differ between networks according to several factor as, for example, their consensus algorithm, level of congestion, number of nodes, underlying technology . . . . With this high performance policy, when an application smart contract do not require a specific level of trust (that is, it is not mandatory to execute the smart contract in many networks or in a specific network), the networks with the lower execution time of smart contracts are selected to leverage the trust, achieving a low time overhead. In other words, the ZKProof Trust Algorithm (which will be later explained) is triggered in networks with a low time overhead, regardless of their level of trust.

Sampling policy: It uses a sampling algorithm (round-robin, random, etc.) so that only every "n" executions of the smart contract, the ZKProof Trust Algorithm is triggered in an external network. This policy will lead to cost savings and lower performance overheads.

Event policy: It forces the trigger of an event through the policy smart contract of an external network, and the execution of the application smart contract cannot be resumed until this event has occurred.

Random policy: When a trust policy is desired but no specific one is required. That is, no specific trust policy or type of trust policy is enforced, so any available trust policy can be chosen.

These are examples of potential trust policies, but additional and personalized trust policies may be implemented using Trust Policy Contracts in any of the connected DLT networks according to the specific needs of an application due to the generality of the framework components. Application developers are able to select their the trust policy that better suits their needs in terms of cost, performance overhead, and level of trust required.

Application Smart Contracts: They implement the smart contract logic of DLT applications in the networks. They represent the distributed logic from decentralized applications that want to be protected by leveraging the use of trust policies for enhanced trust (using this proposed invention). In other words, said application smart contracts are just pieces of distributed logic implemented for the operation of user decentralized applications that wants to enhance their level of trust. Hence, programmers implementing a decentralized application using smart contracts over DLT networks, implementing the proposed invention will be able to enforce their application smart contracts with the proposed trust enhancing mechanism. The proposed invention may be seen as a mechanism (usually system code) implemented in a DLT network to enable any decentralized application to enhance their level of trust.

Figure 2:
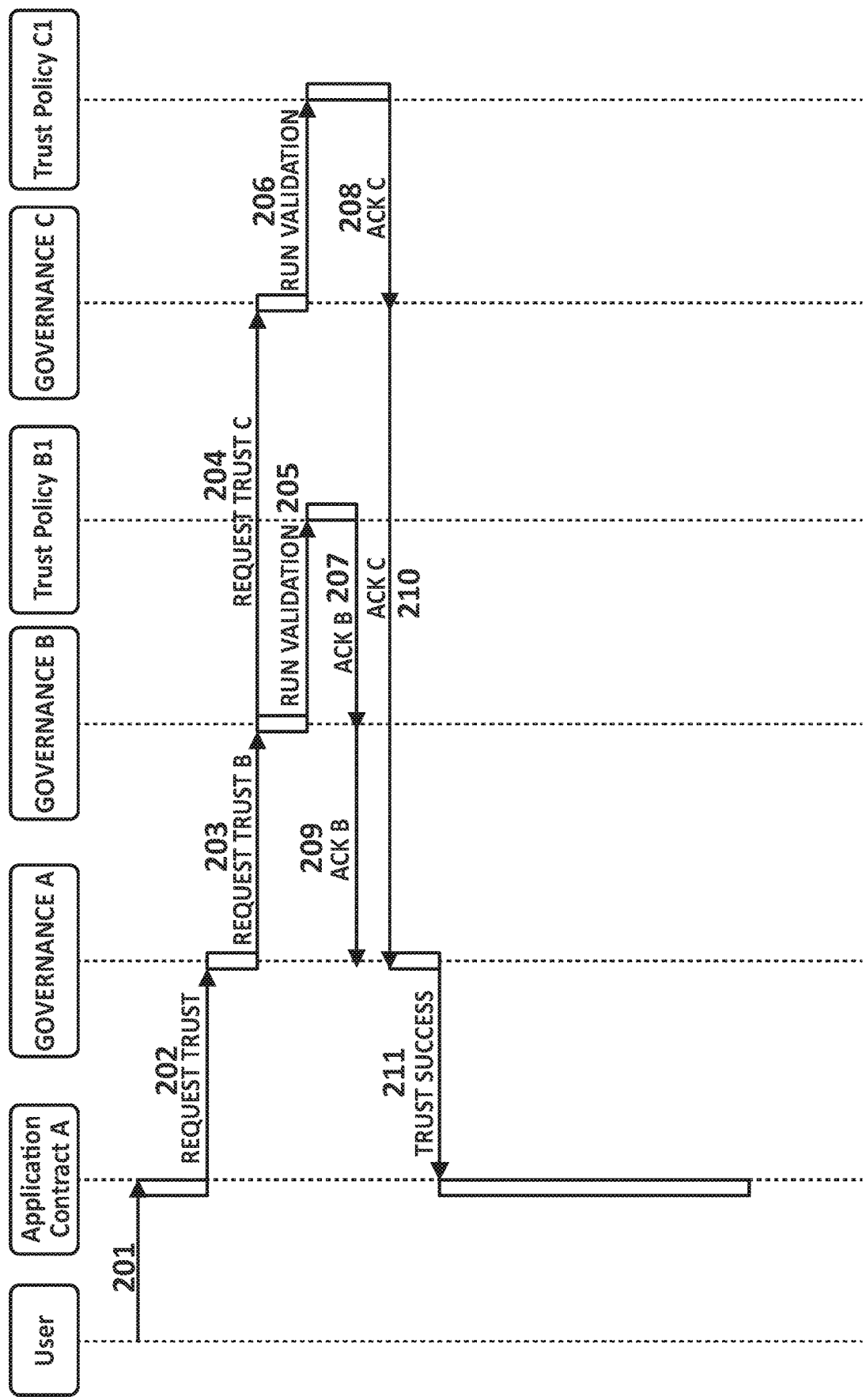
FIG. 2 shows a schematic diagram of the main transactions of a trust policy execution according to one embodiment in the invention.

An example of how these contracts are operated (which transactions are made between the different modules and networks) is presented in FIG. 2 (taking as reference architecture the one in FIG. 1). For clarity purposes, in the figures, the transactions in each network are shown as a single transaction; however, as they are DLT networks, all the smart contracts are usually executed in every node of the network so said transactions in each network are usually made in every node of the network.

Let's consider an user of network A which wants to verify a the execution of a certain smart program (for example, to modify a network ledger). This is requested (201) by the user to the Application Contract module in network A (actually the user requests it to one specific node of network A, and from there, usually the Application Contract module is triggered and executed in all the nodes of network A). In this example, a basic trust policy identified with id=1 will be used, where this trust policy implies that the application smart contract from network A leverage the trust level of network B and C (that is, network A uses networks B and C to improve the trust of the operation). This is only an example and any other trust-policy could be used. Before the application smart contract is allowed to modify its network ledger, it will be forced to fulfil the corresponding trust policy and ZKProof Trust Algorithm. Thus, the application smart contract in network A communicates (202) with its Governance Contract (Governance A) requesting the execution of the trust policy 1; as previously stated this trust policy requires a successful run of the ZKProof Trust Algorithm in networks B and C. Governance A, using its network registry, then requests these executions to the Governance Contracts in network B and C (203, 204). This is usually done in each node of network A; that is, each Governance contract of each node of network A sends a message requesting the validation to Governance Contracts of nodes of networks B and C (the information about the specific node of networks B and C to which each node of network A communicates, will be the "network_trusted_endpoints" stored in the network registry of the governance contract of each node). The communication between networks A and network B is made through a first communications network using any known communication technology and the communications between networks A and network C is made through a second communications network (the same or different than the first communications network) using any known communication technology.

Governance B and Governance C use their policy registry module to obtain the specific address for trust policy 1 smart contract and trigger its execution (run the ZKProof Trust Algorithm) in their corresponding networks (205, 206). The results of said execution (207, 208) are returned to their Governance modules and from there, to Governance A (209, 210), responsible for processing and communicating (211) the results of the trust policy execution to the application smart contract. If the result is successful, the application smart contract is allowed to modify the network's world state, if not, the execution of the application smart contract is aborted.

Usually, in a DLT network, the consensus algorithm (in his case the ZKProof-based algorithm), and generally speaking any smart contract, is run by every computing node in the network, consequently this validation is run by every node. The ZKProof Algorithm is triggered by the application smart contract that is being executed by every node in network A. This triggers the execution of the validation code (the ZKProof Algorithm) in networks B and C, also executed by all the nodes in these networks. This is a consequence of the underlying operation of smart contract-based DLT networks, as distributed logic is run by every node of the network.

That is, when it is disclosed that a validation (in this case a ZKProof Trust Algorithm) or a smart contract is run in a certain network, usually it is meant that said validation (said algorithm) or smart contract is run in every node of the network. And the validation in a network will be successful if it is successful in all the nodes of said network or in at least a certain number of nodes (according to the specific consensus algorithm of the target network). Summarizing, preferably all the nodes of the target network (from which the trust want to be leveraged) run the validation algorithm, and the validation must be correct (positive) at least in the minimum number of nodes dictated by the network's consensus algorithm.

Figure 3:
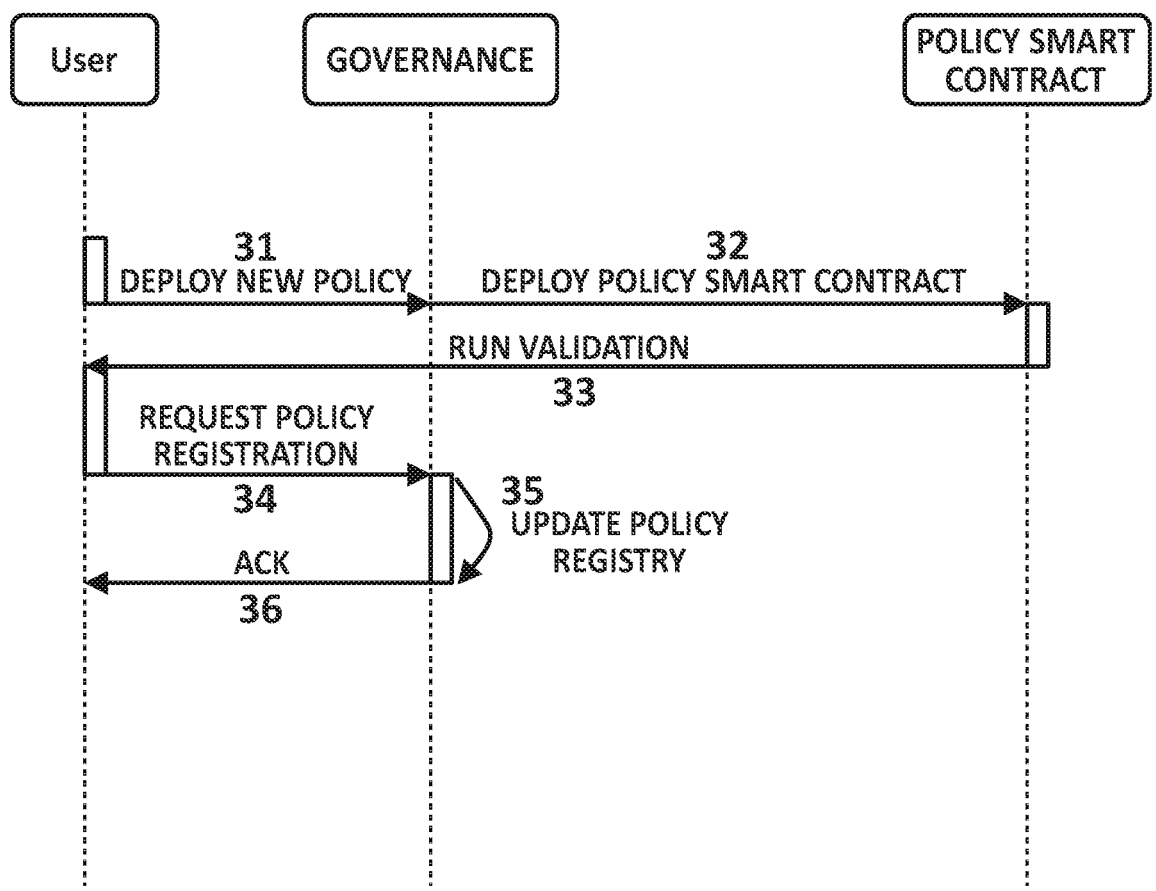
FIG. 3 shows a schematic diagram of the main transactions for deployment of a new trust policy in a network according to one embodiment in the invention.

As mentioned above, the deployment of additional trust policies is also allowed in the proposed solution. The process of deployment of additional trust policies, according to an embodiment of the invention, is depicted in FIG. 3. A user requests the deployment of a new trust policy smart contract in the network; in order to do so, it contacts the Governance (31) of (a node of) the network, which deploys the policy smart contract (32) and run a validation of said policy smart contract (33). Actually, the user requests it to one specific node of network A, and from there, usually the validation is triggered and executed in all the nodes of the network.

If the deployment is successful, the user will have to request its public registration to the Governance (34) in order for it to be publicly available. The Governance verifies in the Governance Logic Module if the user has enough permissions to add a new policy; additional verification functions of the deployed smart contracts may be implemented to check its correctness such as a number of independent signatures that assure its correctness or any other method desired as advanced above (this is usually done in each node of the network). If the user has enough permissions and the correctness verification is successful, the Governance (of each node) updates the Policy Registry with the new policy (35) and informs the user (36). In an embodiment, the governance contract of at least one node will inform the other networks of the new policy, in order to be implemented and available also in the nodes of said networks.

Figure 4:
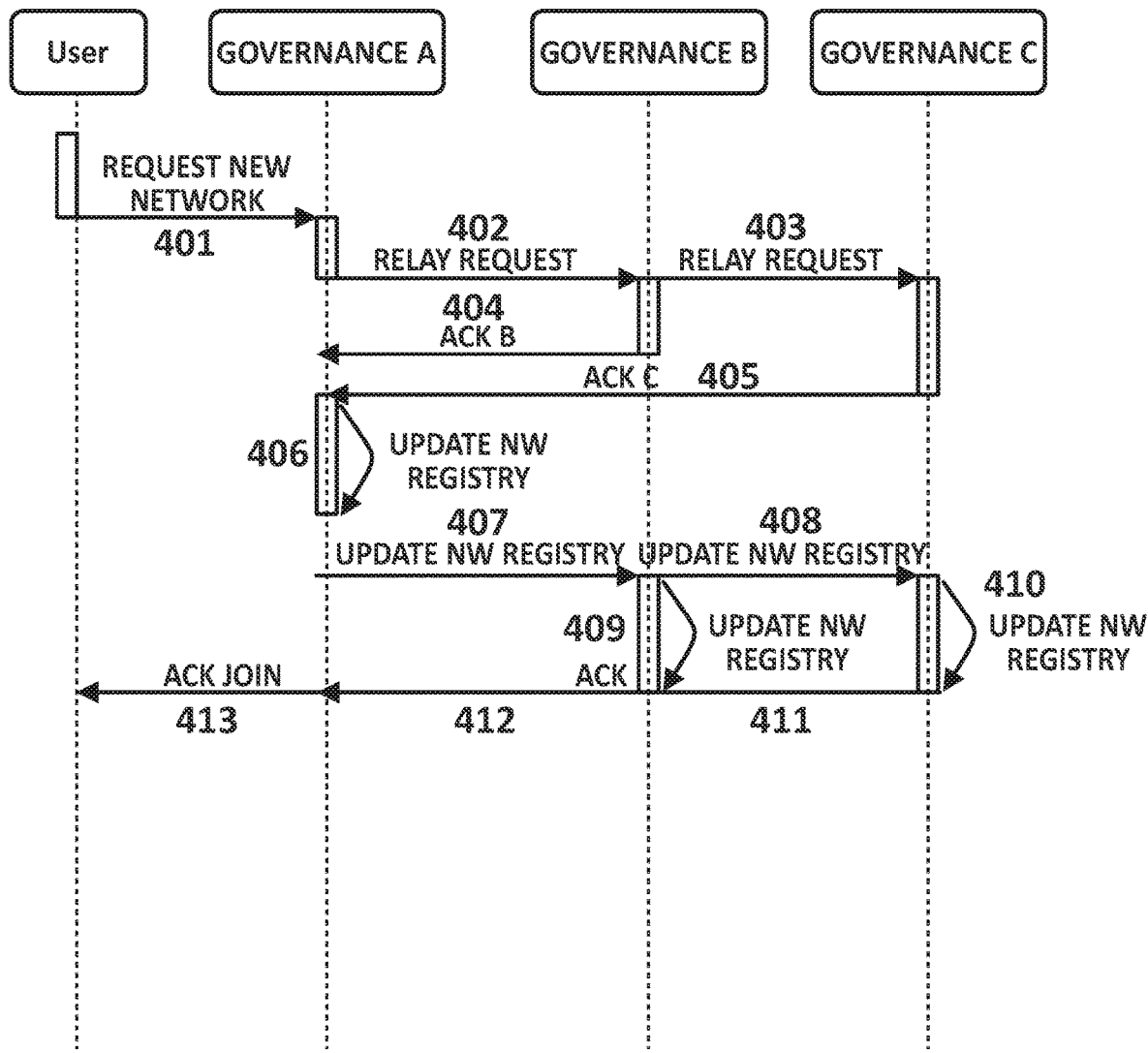
FIG. 4 shows a schematic diagram of the main transactions for adding a new network to the interoperability system according to one embodiment in the invention.

The acceptance of a new connected network to the system (to interoperate with the other networks) follows an analogous process as adding a new trust policy from above. The process of adding a new network, according to an embodiment of the invention, is depicted in FIG. 4. A user, or entity, may request (401) the interconnection of a network through the Governance of (a node of) any of the already interconnected networks (network A in the case of FIG. 4). This Governance will trigger the network verification logic (402, 403) in the rest of the connected networks (B and C) and usually also in the network A itself. The verification logic may consist on collecting a minimum of signatures, running specific logics or any other desired process (these validation processes may be equivalent to the ones at trust policies, but need to be implemented in all the already connected networks). This verification logic may be built over the ZKProof algorithm that will be later explained (the ZkProof algorithm ensures that the cross-execution of validations between networks is secure and correct). The Governance where the request for a new network was triggered, waits for the rest of Governances in the other networks to answer him (404, 405), and if all the verifications (or at least a pre-established minimum of them, according to the specific algorithm) are successful, the new network is accepted to the system, and the network registry updated consequently in the network A where the request for a new network was triggered (406). Network A sends a message to the rest of the networks (407, 408) and they update the new network in their networks registers (409, 410) and send the confirmation to network A and, from there, to the user (411, 412, 413).

To ensure that the execution of trust policies actually leverages the level of trust of networks external to a source network (for example, in FIG. 1, the source network will be network A and the external networks would be networks B and C), and that attacks in a network's smart contract can be detected from these external networks while running trust policies, the system uses a ZKProof (Zero Knowledge Proof) Trust Algorithm. The ZKProof Trust Algorithm leverages the use of a ZKSnarks (Zero-Knowledge Succinct Non-Interactive Argument of Knowledge)-based protocol between networks for this matter. This protocol's aim is to detect and prevent not-allowed or malicious modifications over the states of a smart contract. Thus, with this ZKProof Trust Algorithm, the smart contract running the trust policy in the source network needs to prove to the network, where it is leveraging the trust from, that its state has not been illegally modified. Hence, through the execution of the algorithm, and without having any access to the ledger of the source network, the nodes in the destination network, through the proof provided from the source network and the information stored from previous executions of this protocol, are able to detect and prevent invalid modifications of the state. For clarity purposes, before the operation of the ZkProof Trust Algorithm used in this invention is presented in detail, a brief introduction on the basic building block of the algorithm ZKSnarks is explained hereby.

ZKSnarks are cryptographic primitives that, given a specific computation function C, such that $C=f(w)$, knowledge of the input (secret or witness) of this function may be proven non-interactively by any other entity by building a Zero Knowledge Proof (that's why it is said that ZkSnarks are a family of non-interactive zero knowledge proof cryptographic primitives). In order to use ZKSnarks in a system, an initial setup phase is required to generate a key to prove and a key to verify, called prover and verifier keys, Pk and Vk, respectively. These keys are then used as input for the proof generation and verification functions as it will be detailed below. In the setup phase a generator function, G, is run for the specific computation function C=f(w)=x the proofs and verifications want to be built for, along with a source of randomness, λ. λ must be kept secret as it is the secret seed material, referred as "toxic waste", the keys are generated from. λ should only be used in the setup phase, and must be destroyed immediately after, as knowledge of it enables the generation of fake proofs. Thus, the setup phase may be summarized through the following function: (Pk, Vk)=G (C,λ).

ZkSnarks mechanisms are thus conformed of two main functions: a proof function and a verifier function. The proof function prf=Proof(Pk,x,w), allows the generation of a proofs of knowledge for a witness, w, i.e. the secret value in the computation function C the keys where generated for in the setup phase. Therefore, the proof function takes as input the prover key, the output of the computation of C=f(w)=x, and the witness, w, and it generates a proof, prf, that when shared with anyone with the correct verifier key, proves them the knowledge of the witness value.

The verifier function is used to validate that the generator of a specific proof had knowledge of certain witness. Thus, the verifier function may be summarized as ver=V(Vk,x,prf) where the input of the function is the proof that wants to be verified (prf), the verifier key generated in the setup phase for the specific computation function (Vk) and the public piece, (x=f(w)), related to the correct witness, w. The output of the verifier function, ver, is a Boolean value such that if the proof demonstrates knowledge of the correct value of the witness, the verifier function outputs true, otherwise it outputs false. Hence, ZkSnarks allow the proof knowledge of a specific value (witness, w) without leaking any information about it to its counterpart. Any proof and verifier functions could be used (they are standard and well-known concepts in the field of zero-knowledge proofs). The specifics of the proof and verifier functions depend on the specific ZkSnark primitive selected for the implementation of the invention.

The ZKProof Trust Algorithm employed in a preferred embodiment of the present invention, uses a protocol based in ZKSnarks between networks to achieve enhanced trust as follows:

The computation function of the ZKProof Trust Algorithmn is the following:

$$C=\text{hash}(w)==x$$

with its corresponding generated prover and verifier keys, Pk and Vk, generated as previously explained.

Let Policy 1 be the trust policy contract used by an application smart contract of DLT network A (source network) that wants to leverage the trust of an external network B. The app smart contract of DLT A needs to proof through Policy A the correctness of its execution to network B. To achieve this, Policy A builds a ZKSnark Proof in the following way:

The app smart contract triggers the run of the ZKProof Trust Algorithm through the trust policy module of network A for Policy 1 (called hereby Policy A1). Policy A then builds the following hash hi: h(i)=hash (addr_SC_App,txid,fx(attr),attr,res)

where addr_SC_App is the address of the application smart contract; txid the transaction ID that triggered the policy; fx(attr) the function that triggered the policy run and whose code wants to leverage external levels of trust; attr the attributes of the function; and res the result of the function. The code and functionality of application smart contracts may be divided along different functions (not every function of a smart contract triggers a modification in the ledger, and if it does, each function runs a different logic over the data). This fx(attr) is used to identify the specific function that triggered the execution of the trust policy and with which specific attributes (this allows to identify the specific logic ran over the data).

The value of h(i) identifies uniquely the execution of the smart contract correspondent to Policy A1 and its result.

Policy A1 stores in a mapping structure for each application smart contract the previous value of h(i), i.e. h(i−1), the hash of the previous execution of the policy 1. Using the computed h(i) and the stored value of h(i−1), it calculates diff(i)=h(i)−h(i−1)

Using h(i) and diff(i) a new hash function is built by Policy A: hp(i)=hash(h(i)∥diff(i))

This hash is used to ensure that the current execution of the smart contract, h(i), and the past of policy 1, diff(i), has not been modified. The new value of h(i) is stored in Policy A's mapping for the current application smart contract. Using the value of hp(i), public value, and diff(i), the secret witness of the ZKSnark primitive, the following proof is built:

$$\text{prf}(i)=\text{Proof}(Pk,hp(i),\text{diff}(i))$$

This proof will enable Policy B1 (the trust policy module of network B for Policy 1) to validate the correctness of the execution of the application smart contract. Thus, prf(i) and h(i) is sent to Policy B1 (through the governance module of A and the Governance module of B, as shown in FIG. 2) in order for him to verify the execution.

With the reception of h(i) and prf(i) from DLT network A, Policy B1 starts verifying the proof in order to validate the execution of the application smart contract as follows:

Firstly, using the h (i−1) stored for the app smart contract in Policy B1's mapping from previous executions of policy 1 and the received h(i), it computes:

$$\text{diff}(i)=h(i)-h(i-1)$$

Using diff(i) and the received h(i) the following formula is computed:

$$hp(i)=\text{hash}(h(i)\|\text{diff}(i))$$

Using diff(i), the computed hp(i), and the proof received, Policy B verifies the proof to validate the consistency of the application smart contract execution consistency using:

$$\text{Verify}(Vk,hp(i),\text{prf}(i))$$

If the proof is verified correctly (by all the computing nodes of networks B and C or by a significant group of them, depending on the embodiment), an ACK is sent from Policy B1 to Policy A1 (through Governance Modules B and A) indicating that the application smart contract is allowed to continue its execution and to modify the ledger. If, on the contrary, the verification is not successful, Policy B1 sends a KO message to Policy A1, the execution of the application smart contract is aborted (so the ledger is not modified) and preferably a notification is sent to the network A governing entities indicating that a potential attack may have been suffered in the network. The correct verification of the proof in the ZKProof Trust Algorithm by network B means that the execution of the smart contract and the corresponding update of the ledger in network A is correct and consistent with the history of the states for the application smart contract. If the verification is not successful it means that either past states of the application smart contract have been illegally modified, or the state update proposed it is not consistent with the smart contract's state history.

In the following table, a summary of the ZKProof Trust Algorithm previously explained is depicted using pseudo-code.

```
##################
SETUP PHASE ##
##################
C = hash(w) == x
(Pk, Vk) = G(C, lambda)
################################################
POLICY A - ZKPROOF TRUST ALGORITHM ##
################################################
var hi = hash(addr_SC_app, txid, fx, attr, res)
var diffi = hi - GetFormLedgerA(addr_SC_app, hi-1)
var hpi = hash(hi || diffi)
StoreInLedgerA(addr_SC_app, hi)
var proofi = ZKProof(pk, hpi, diffi)
SendPolicyB(proofi, hi)
################################################
POLICY B - ZKPROOF TRUST ALGORITHM ##
################################################
var proofi, hi = ReceivePolicyA(proofi, hi)
var diffi = hi - GetFromLedgerB(addr_SC_app, hi-1)
var hpi = hash(hi || diffi)
var vrfi = ZKVerify(Vk, hpi, proofi)
if(vrfi) {
    StoreInLedgerB(addr_SC_app, hi)
    SendPolicyB(OK)
} else {
    SendPolicyB(K0)
}
```

Summarizing, the present invention supports the implementation of trust policies at smart contract level to leverage the different levels of trust of any of the connected DLT networks, hence, having the ability to exploit from a private DLT network an equivalent level of trust of a public DLT network. To achieve this a ZkProof Trust Algorithm Protocol is used between networks. Having a smart contract-based approach allows these networks to be public, private or permissioned (there is no restriction as of the type of network to connect as long as it runs smart contracts), and the use of replicated Governance smart contracts in every network ensures a level of self-governance of the system (dictated by the specific implementation of the smart contract). Consequently, this invention enables small dedicated (and frequently private) DLT networks used in specific use cases to leverage the level of trust of bigger general-purpose networks. Thus, in the current DLT landscape in which corporations are joining in small consortiums and building small DLT networks for specific projects, they will be able to enhance these networks (and projects) level of trust by interconnection with other small private network, or bigger general-purpose ones (building a constellation of interconnected trusted DLT networks).

The description and drawings merely illustrate the principles of the invention.

The proposed solution have been presented here according to several embodiments, but of course, several alternative implementations of this architecture are supported according to the specific underlaying DLT platforms connected to it, the smart contract implementation for the Governance and policy contracts, and the specific validation and governance algorithms used in the different networks. In other words, although the present invention has been described with reference to specific embodiments, it should be understood by those skilled in the art that the foregoing and various other changes, omissions and additions in the form and detail thereof may be made therein without departing from the scope of the invention as defined by the following claims. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for enhancing a level of trust of a first Distributed Ledger Technology (DLT) network using one or more second DLT networks, where the first and the one or more second DLT networks comprise several computing nodes and are independent DLT networks connected by one or more telecommunications networks, the method comprising:
   a) Receiving in the first DLT network a request to validate a smart contract, where for validation of the smart contract a trust policy is used;
   b) Computing a hash value h(i) which identifies uniquely a current execution of the smart contract correspondent to a function that triggered the trust policy and a result of the function that triggered the trust policy, and storing said hash value h(i) in a database of the first DLT network;
   c) Obtaining a hash value h(i−1) of a previous execution of the smart contract;
   d) Transmitting from the first DLT network to the one or more second DLT networks, through at least one of the one or more telecommunications networks, a validation instruction including h(i) and a zero-knowledge proof (prf(i)), wherein prf(i)=Proof(Pk, hp(i), diff(i)), where Proof( ) is a pre-established function, Pk is a pre-established random proof key, diff(i)=h(i)−h(i−1) and hp(i)=hash(h(i)||diff(i));
   e) Receiving through at least one of the one or more telecommunications networks, from each of the one or more second DLT networks to which the validation instruction has been sent, a validation result, where the validation result is obtained in each of the one or more second DLT networks by computing: Verify (Vk, hp(i)$_2$, prf(i)) where Verify( ) is a pre-established verification function, Vk is a pre-established random verification key, hp(i)$_2$=hash(h(i)||diff(i)$_2$)), and diff(i)$_2$=h(i)−h(i−1)$_2$ where h(i−1)$_2$ is a hash value stored in each respective second DLT network in the previous execution of the validation for the smart contract; and f) Aborting further execution of the smart contract in the first DLT network, if more negative validation results than a pre-established threshold are received from the one or more second DLT networks.

2. A method according to claim 1, wherein said hash value h(i)=hash (addr_SC_App, txid, fx(attr), attr, res), wherein addr_SC_App is an address of an application implementing the smart contract; txid is a transaction ID that triggered the trust policy; fx(attr) is the function that triggered the trust policy; attr is an attribute of the function that triggered the trust policy; and res is the result of the function that triggered the trust policy.

3. A method according to claim 1, wherein a computation of Verify (Vk, hp(i)$_2$, prf(i)) is made in all computing nodes of each of the one or more second DLT networks and the validation result received from each of the one or more second DLT networks is positive only if a result of the pre-established verification function is positive in all the computing nodes of said each one or more second DLT networks or if the result of the pre-established verification function is positive in a number of computing nodes of said each one or more second DLT networks higher than a second pre-established threshold.

4. A method according to claim 1, wherein the smart contract to be validated is for modification of a network ledger.

5. A method according to claim 1, wherein a communication between the first DLT network and the one or more second DLT networks is made through a governance instance in each computing node of the first DLT network and the one or more second DLT networks, which manage an interconnection logic between DLT networks, wherein each of the governance instance stores information about all other first DLT network and one or more second DLT networks.

6. A method according to claim 5, where in step d), using stored network information about the second DLT network the governance instance of a computing node of the first DLT network sends the validation instruction to the governance instance of a computing node of each of the one or more second DLT networks through the one or more telecommunication networks.

7. A method according to claim 1, wherein each computing node of each of the first DLT network and of the one or more second DLT networks has a register with available trust policies in the DLT network to which a computing node belongs and when a network user wants to add a new trust policy to the first DLT network or one of the one or more second DLT networks, at least one computing node in said DLT network checks if the user has enough permissions to add the new trust policy and only if the user has permission, the new trust policy is registered.

8. A method according to claim 1, wherein each computing node of each of the first DLT network and of the one or more second DLT networks has a register with available DLT networks to be used to enhance the level of trust, and when a network user sends a request to add a new DLT network, at least one computing node of the DLT network where the request is received, sends the request to the other first DLT network and one or more second DLT networks, which verify if the new DLT network is accepted and only if at least a third pre-established threshold of the other first DLT network and one or more second DLT networks accept the new DLT network, the new DLT network is registered in all computing nodes of the first DLT network and the one or more second DLT networks as the new DLT network to be used to enhance the level of trust.

9. A system for enhancing a level of trust of a first Distributed Ledger Technology (DLT) network using one or more second DLT networks, where the first and the one or more second DLT networks are independent DLT networks connected by a telecommunications network, the system comprising the first DLT network and the one or more second DLT networks, the first DLT network comprising at least one computing node comprising a processor configured to:

receive a request to validate a smart contract, where for validation of the smart contract a trust policy is used;

compute a hash value h(i) which identifies uniquely a current execution of the smart contract correspondent to a function that triggered the trust policy and a result of said function, and store said hash value in a database of the first DLT network;

obtain a hash value h(i−1) of the previous execution of the smart contract;

transmit to a computing node of the one or more second DLT networks a validation instruction including h(i) and a zero-knowledge proof (prf(i)), where prf(i)=Proof(Pk, hp(i), diff(i)), where Proof( ) is a pre-established function, Pk is a pre-established random proof key, diff(i)=h(i)−h(i−1) and hp(i)=hash (h(i)∥diff (i));

the one or more second DLT networks comprising:

at least one computing node comprising a processor configured to:

(i) receive the validation instruction from the first DLT network directly or through another computing node of one of the one or more second DLT networks which at least one computing node belongs to; and (ii) determine a validation result by calculating: Verify (Vk, hp(i)$_2$, prf(i)) where Verify( ) is a pre-established verification function, Vk is a pre-established random verification key, hp(i)$_2$=hash(h(i)∥diff(i))$_2$, and diff(i)$_2$=h(i)−h(i−1)$_2$ where h(i−1)$_2$ is a hash value stored in the computing node in the previous execution of the validation for the smart contract;

where further execution of the smart contract in the first DLT network is aborted, if more negative validation results are received from the one or more second DLT networks than a pre-established threshold.

10. A non-transitory digital data storage medium for storing a computer program which comprises instructions causing a computer executing the program to perform the method according to claim 1.

* * * * *